(12) United States Patent
Eliasson

(10) Patent No.: US 6,752,468 B2
(45) Date of Patent: Jun. 22, 2004

(54) SAFETY DEVICE AND SAFETY PROCEDURE IN THE CASE OF A TIPPING DUMP BODY OF A TRUCK

(75) Inventor: Göran Eliasson, Braas (SE)

(73) Assignee: Volvo Articulated Haulers AB, Växjö (SE)

( * ) Notice: Subject to any disclaimer, the term of this patent is extended or adjusted under 35 U.S.C. 154(b) by 0 days.

(21) Appl. No.: 10/065,825

(22) Filed: Nov. 22, 2002

(65) Prior Publication Data

US 2003/0127269 A1 Jul. 10, 2003

Related U.S. Application Data

(63) Continuation of application No. PCT/SE01/01160, filed on May 23, 2001.

(30) Foreign Application Priority Data

May 29, 2000 (SE) .............................................. 0002017

(51) Int. Cl.[7] .............................................. B60K 28/04
(52) U.S. Cl. .................................... 298/22 C; 180/331
(58) Field of Search ............................ 298/22; 180/315, 180/318, 330, 331

(56) References Cited

U.S. PATENT DOCUMENTS

| | | | | |
|---|---|---|---|---|
| 3,921,128 A | | 11/1975 | Snead ....................... 340/52 H |
| 4,553,734 A | | 11/1985 | Oka et al. ..................... 251/58 |
| 4,922,769 A | * | 5/1990 | Tury ........................... 477/125 |
| 5,062,759 A | * | 11/1991 | Pieperhoff ................... 414/408 |
| 5,109,945 A | * | 5/1992 | Koga .......................... 180/273 |
| 5,161,422 A | * | 11/1992 | Suman et al. ................. 74/335 |
| 6,435,289 B1 | * | 8/2002 | Hori et al. .................... 180/6.3 |
| 2002/0017416 A1 | * | 2/2002 | Gotz ........................... 180/287 |

FOREIGN PATENT DOCUMENTS

| | | |
|---|---|---|
| DE | 242467 A1 | 5/1975 |
| DE | 2652854 A1 | 5/1978 |
| EP | 0061542 A1 | 10/1982 |

* cited by examiner

Primary Examiner—Paul A. Chenevert
(74) Attorney, Agent, or Firm—Novak Druce LLP

(57) ABSTRACT

Safety device and safety procedure in the case of a tipping dump body (2) of a truck (1), in which the dump body (2) through the operation of a control (11) in the driver's cab (4) of the vehicle (1) and by means of at least one hydraulic or pneumatic lifting cylinder (5) is designed to be moved between a lowered transport position (6) and a raised tipping position (7), and to assume a floating position, in which the lifting cylinder (5) is not pressurized and a holding position in which the lifting cylinder (5) is pressurized and the position of the dump body (2) is locked. The device includes a detector (13) that is designed for detection of the driver's presence in, or absence from the driver's cab (4), and that either a presence signal or an absence signal is delivered to the control (11) depending on whether or not the driver is in the driver's cab. The control (11) is designed, in the event of an absence signal from the detector (13), to assume the holding position.

19 Claims, 5 Drawing Sheets

SAFETY DEVICE AND SAFETY PROCEDURE IN THE CASE OF A TIPPING DUMP BODY OF A TRUCK

CROSS REFERENCE TO RELATED APPLICATIONS

This application is a continuation patent application of International Application No. PCT/SE01/01160 filed May 23, 2001 which was published in English pursuant to Article 21(2) of the Patent Cooperation Treaty, and which claims priority to Swedish Application No. 0002017-2, filed May 29, 2000. Both applications are expressly incorporated herein by reference in their entireties.

BACKGROUND OF INVENTION

1. Technical Sphere

The invention relates to a safety device and a safety procedure in the case of a tipping dump body of a truck. The dump body is tipped generally by means of two hydraulic lifting cylinders. The invention is especially intended for use in waist-controlled trucks (articulated haulers), but can advantageously also be adapted to other trucks provided with tipping dump bodies or other types of tipping flatbed.

2. Background

Normally, by operating a control in the driver's cab of the vehicle, a tipping dump body of the aforementioned type can be made to assume a so-called floating position, in which the lifting cylinders are not pressurized and the dump body is free to turn about its tipping center. The floating position is used partly during transport with the dump body resting, with unpressurized lifting cylinders, against the vehicle chassis frame in order to transmit the line of forces downwards from the dump body to the chassis frame in the most advantageous way possible. This floating position is also partly used when the dump body is loaded in such a way, or is in such a position, that it can be lowered from the raised position to the transport position under its own weight and without the action of the lifting cylinders. Where necessary, however, the driver can also lock the dump body in a so-called holding position in which the lifting cylinders are pressurized by means of valve elements in such a way that the position of the dump body is locked in any desired position.

One problem with conventionally designed trucks of this type is that the dump body is allowed to assume the floating position even when the driver is out of the vehicle driver's cab and thereby no longer has control over the dump body. In this situation, for example, a strong gust of wind may cause the "floating" dump body to slowly start to turn about its tipping center and to be lowered, uncontrolled, onto the chassis frame, resulting in material damage.

SUMMARY OF INVENTION

The aforementioned problem(s) are overcome via the safety arrangement and procedures of the present invention (s). In an exemplary embodiment, the invention takes the form of a safety device in a tipping dump body of a truck in which the dump body, through the operation of a control in the driver's cab of the vehicle, and by means of at least one preferably hydraulic lifting cylinder, is designed to be moved between a lowered transport position and a raised tipping position. A floating position is also accommodated in which the lifting cylinder is not pressurized, as is a holding position in which the lifting cylinder is pressurized and the position of the dump body is locked. In the example, the device has the characteristics of a detector that is designed for detection of the driver's presence in, or absence from, the driver's cab. Via this device, either a presence signal or an absence signal is delivered to a controller depending on whether or not the driver is in the driver's cab. Preferably, the control is designed, in the event of an absence signal from the detector, to assume the holding position.

The invention also relates to a safety procedure for the operation of a dump body of a truck in which the dump body, through the operation of a control in the driver's cab, and by means of at least one preferably hydraulic lifting cylinder, is moved between a lowered transport position and a raised tipping position. In this aspect of the invention, the procedure further permits the dump body to assume a floating position, in which the lifting cylinder is not pressurized, and to assume a holding position in which the lifting cylinder is pressurized and the position of the dump body is locked. An exemplary procedure according to this aspect of the invention includes the characteristics of a detector that detects the driver's presence in, or absence from, the driver's cab and delivers either a presence signal or an absence signal to the control depending on whether or not the driver is in the driver's cab. The control is configured to, in the event of an absence signal from the detector, assume the holding position.

In summary, the several aspects of the present invention (s) provide a safety system and method that simply and cost-effectively eliminates, or at least reduces, the risk of uncontrolled lowering of the dump body as a result of the dump body being in the floating position when the driver leaves the driver's cab.

Other special features and characteristics of the invention are described in more detail below.

BRIEF DESCRIPTION OF DRAWINGS

The invention will be described in more detail below through exemplary embodiments with reference to the following drawings, in which.

DETAILED DESCRIPTION

Figure 1:
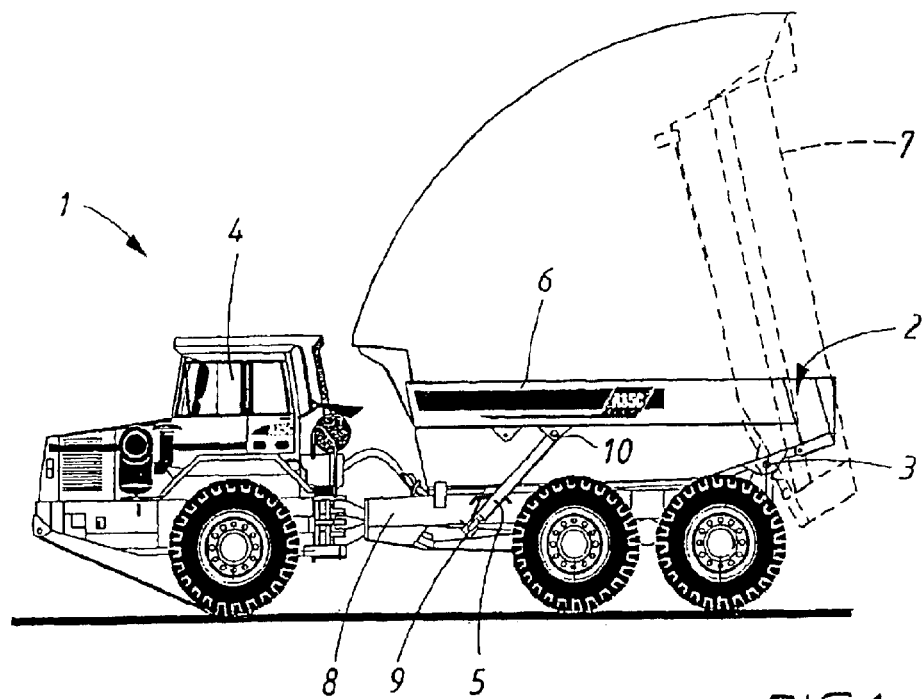
FIG. 1 shows a side view of a waist-controlled truck with tipping dump body.

In FIG. 1, the reference number 1 generally denotes a waist-controlled truck 1, sometimes referred to as an articulated hauler, provided with a tipping dump body 2, which is pivoted about a tipping center 3. The term dump body 2 is also intended to include tipping flatbeds.

The dump body 2 is designed, through operation by the driver of a control 11 (shown in FIG. 2) in the driver's cab 4 of the vehicle 1. The control 11 communicates with, and the dump body 2 is moved by means of at least one hydraulic or pneumatic lifting cylinder 5 (usually two hydraulic lifting cylinders 5) between a lowered transport position 6 and a raised tipping position 7 that is shown in phantom (dashed lines) in FIG. 1. In the transport position 6, the dump body 2 rests on the chassis frame 8 of the vehicle 1. The lifting cylinders 5 are fixed to the chassis frame 8 so that they can pivot about axes 9 and to the dump body 2 so that they can pivot about axes 10.

The dump body 2 is furthermore designed, through operation by the driver, to assume a floating position in which the lifting cylinders 5 are not pressurized, and to assume a holding position in which the lifting cylinders 5 are pressurized and in which the position of the dump body 2 is consequently locked.

Figure 2:
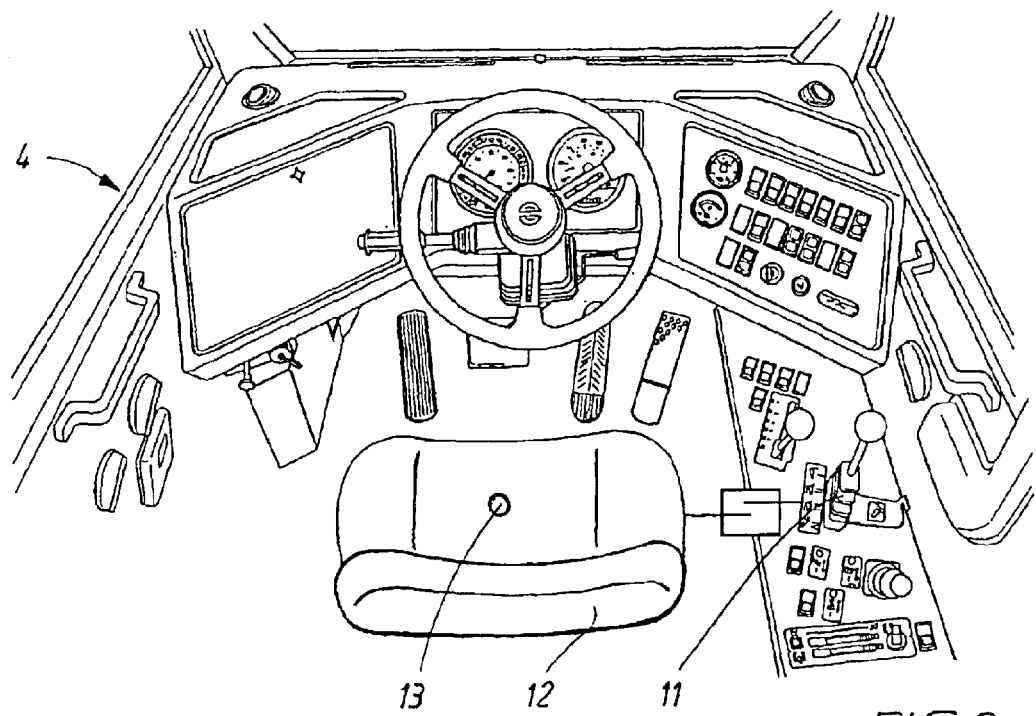
FIG. 2 shows a detached oblique view, from above, of the interior of the driver's cab.

FIG. 2 shows the interior of the driver's cab 4 with, among other things, the control 11 for operation of the tipping dump body 2 located to the right of a driver's seat 12. According to the invention, the driver's seat 12 is provided with a detector 13 designed to detect the driver's presence in or absence from the driver's cab 4, and to deliver either a presence signal or an absence signal to the control 11 depending on whether or not the driver is in the driver's cab 4. In the event of an absence signal from the detector 13, the control 11 is, according to the invention, designed to assume the holding position.

In the embodiment shown, the detector 13 is fitted to the driver's seat 12 in the vehicle 1 and comprises an electrical circuit breaker or switch. As an example, from this configuration, a presence signal (driver detected signal) corresponding to a closed position of the circuit breaker or switch can be generated. Similarly, an absence signal (no-driver detected signal) corresponding to the open position of the circuit breaker or switch can also be generated.

Figure 3:
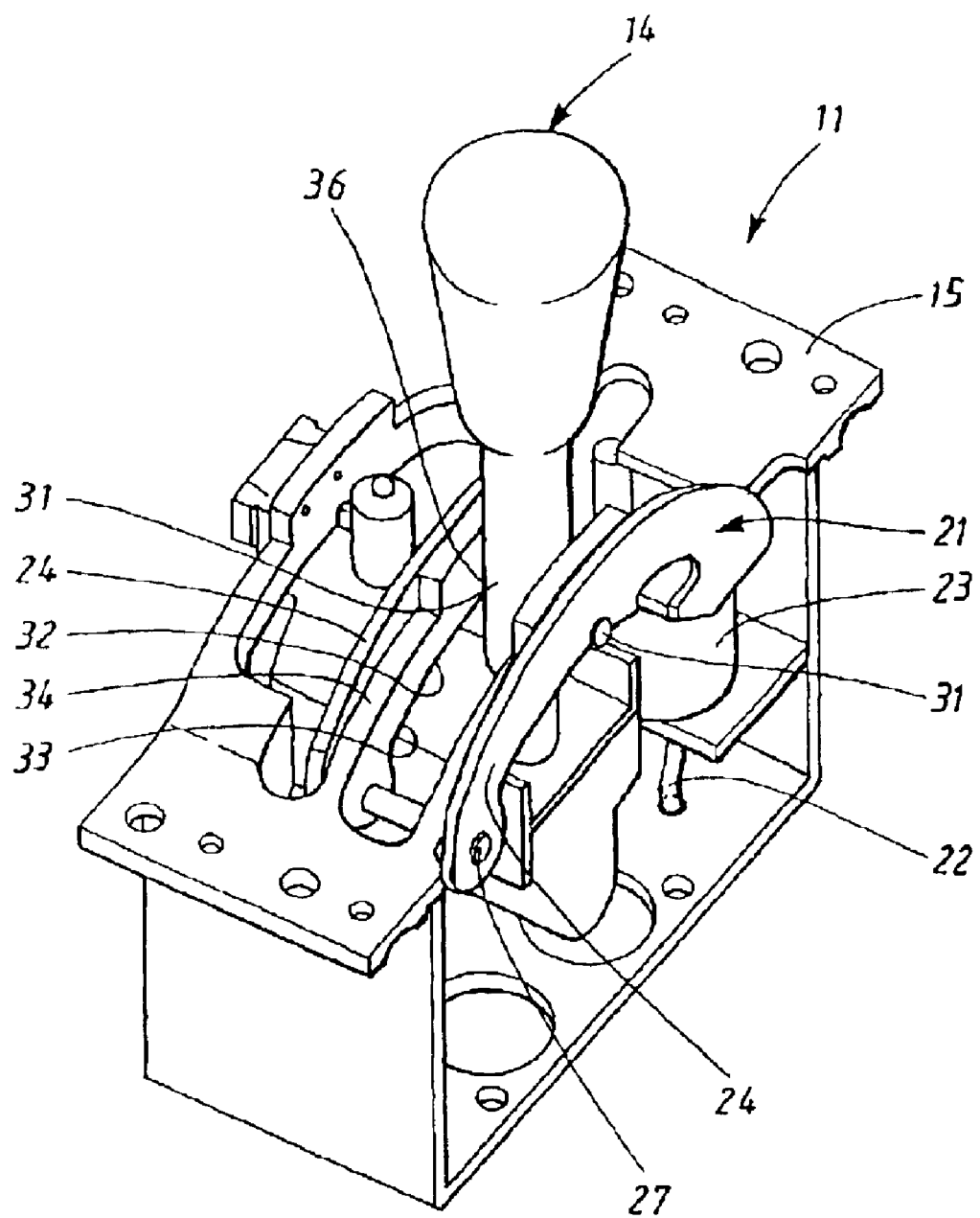
FIG. 3 shows a perspective view of a control according to a preferred embodiment of the invention.
Figure 4:
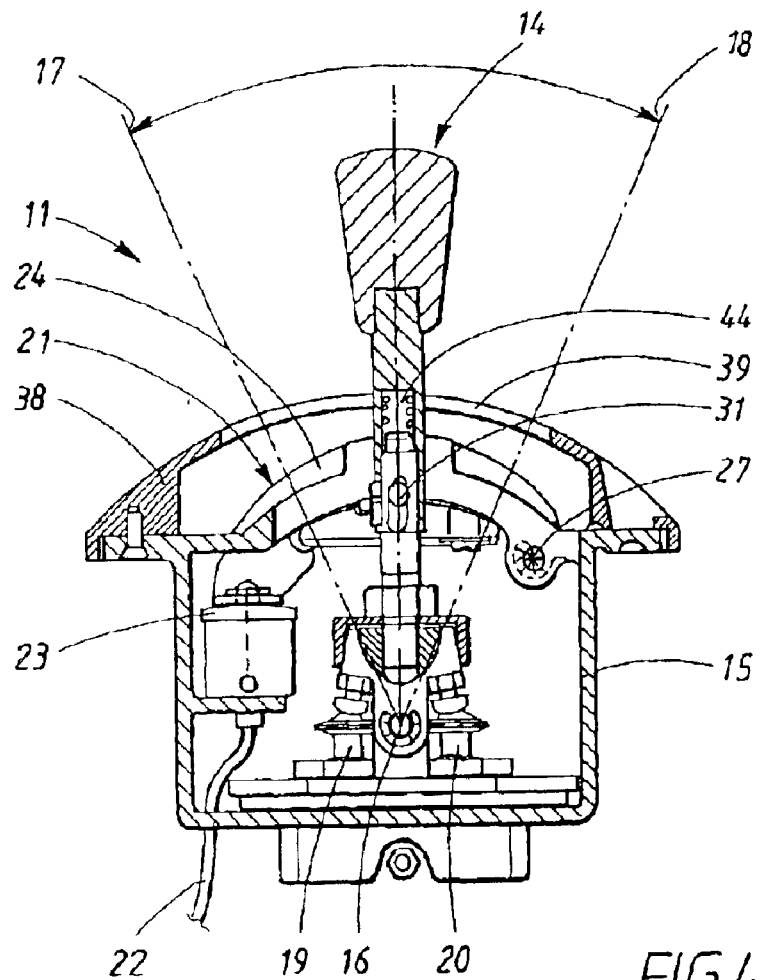
FIG. 4 shows a cross-sectional, partial cut-away side view of the control in FIG. 3, taken along the line 4—4 in FIG. 8. The control in this figure is shown with a cover fitted to the body of the control.

FIGS. 3 and 4 show a preferred embodiment of the control 11. Accordingly the control 11 is suitably provided with an operating lever 14, which is fixed in the body 15 of the control 11 so that it can rotate about a swivel axis 16. The operating lever 14 can in this way be moved between two limit positions 17 and 18, as shown by dashed lines in FIG. 4. The operating lever 14 is furthermore spring-loaded by means of at least one spring element 19, 20 on each side of the swivel axis 16, in such a way that it endeavors to assume an essentially vertical upright holding position (balanced mid-point position) as shown in FIGS. 3 and 4.

The control 11 furthermore includes a mechanical catch member 21, which in an operative position (as shown in FIGS. 3 and 4) is designed to allow the operating lever 11 and hence the dump body 2 to be placed in the floating position. In an inoperative position, the catch member 21 is furthermore designed to permit return of the operating lever 11 to the holding position (or its retention therein) by means of the spring loading.

Figure 5:
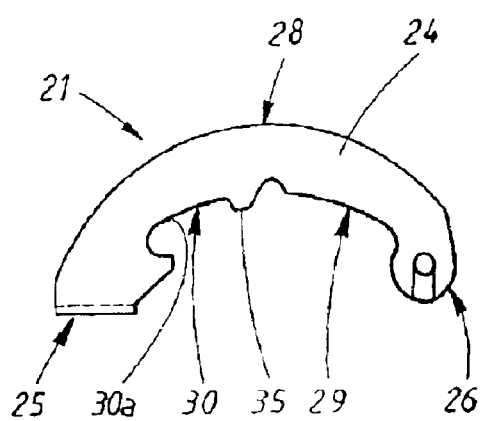
FIG. 5 shows a side view of a mechanical catch member according to the invention.
Figure 6:
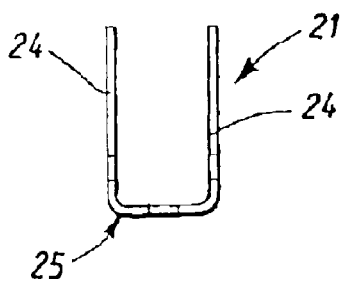
FIG. 6 shows a front view of the mechanical catch member as shown in FIG. 5, from which it can be seen that the catch member has two clevis arms running parallel to one another.

In a preferred embodiment of the invention, the catch member 21 is designed to interact with a solenoid 23, coupled to the detector 13 by way of an electrical lead 22. The solenoid 23 is designed to be activated in the event of a presence signal from the detector 13 and thereby to bring the catch member 21 into its operative position (not shown, but corresponding to a section 30a of an engagement surface 30 shown in FIG. 5). The catch member 21 is furthermore designed to be deactivated in the event of an absence signal from the detector 13, thereby bringing the catch member 21 into its inoperative position which is shown in FIGS. 3 and 4.

As will be apparent from FIGS. 3 to 6, the mechanical catch member 21 preferably includes a divided, curved clevis 24, which has a first end section 25, adapted for engagement with the solenoid 23, and a second end section 26, by which the clevis 24 is pivoted about a suspension axis 27 fixed in the body 15 of the control 11. The clevis arm 24 furthermore has an intermediate section 28, an underside 29 of which has a profiled engagement surface 30 for interlocking engagement with a pin 31 projecting essentially at right angles from the operating lever 14. The pin 31 more specifically projects on each side of the operating lever 14, as will be seen from FIG. 3.

The engagement surface 30 of the clevis arm 24 furthermore includes a first slotted segment for interaction with the pin 31 of the operating lever 14. A second slotted segment 32 for interaction with the pin 31 is formed on the underside 33 of a bridging section 34 of the body 15 of the control 11 extending parallel to the clevis arm 24.

The first slotted segment of the pivoted clevis arm 24 has a downwardly projecting catch heel 35 (see FIG. 5) situated adjacent to the floating position of the operating lever 14, the catch heel 35 being designed to positively lock the pin 31 of the operating lever 14 when the clevis arm 24 is in its operative position and the operating lever 14 is in the floating position. The second slotted segment 32 has a recess 36 for the pin 31 of the operating lever 14, the recess 36 corresponding to the holding position. The recess 36 can be seen in FIG. 3.

Figure 7:
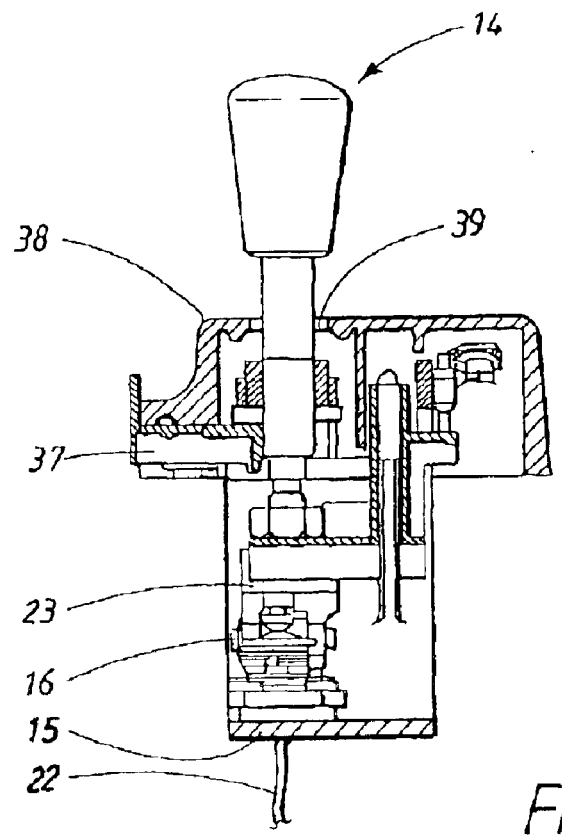
FIG. 7 shows a cross-sectional and partial cut-away view of the control taken along the line 7—7 in FIG. 8.
Figure 8:
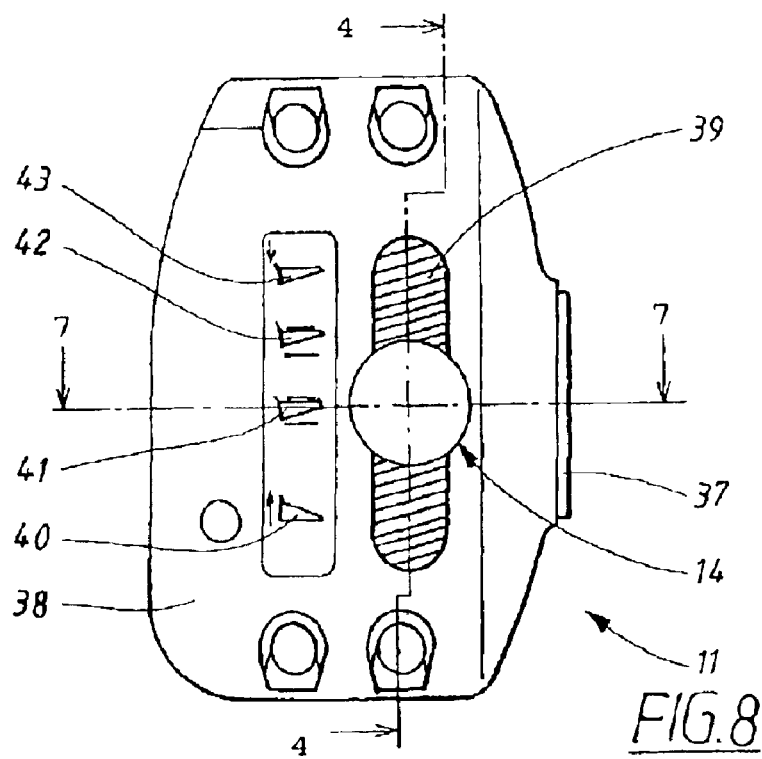
FIG. 8 shows a top view of the control with the cover fitted thereupon.
Figure 9:
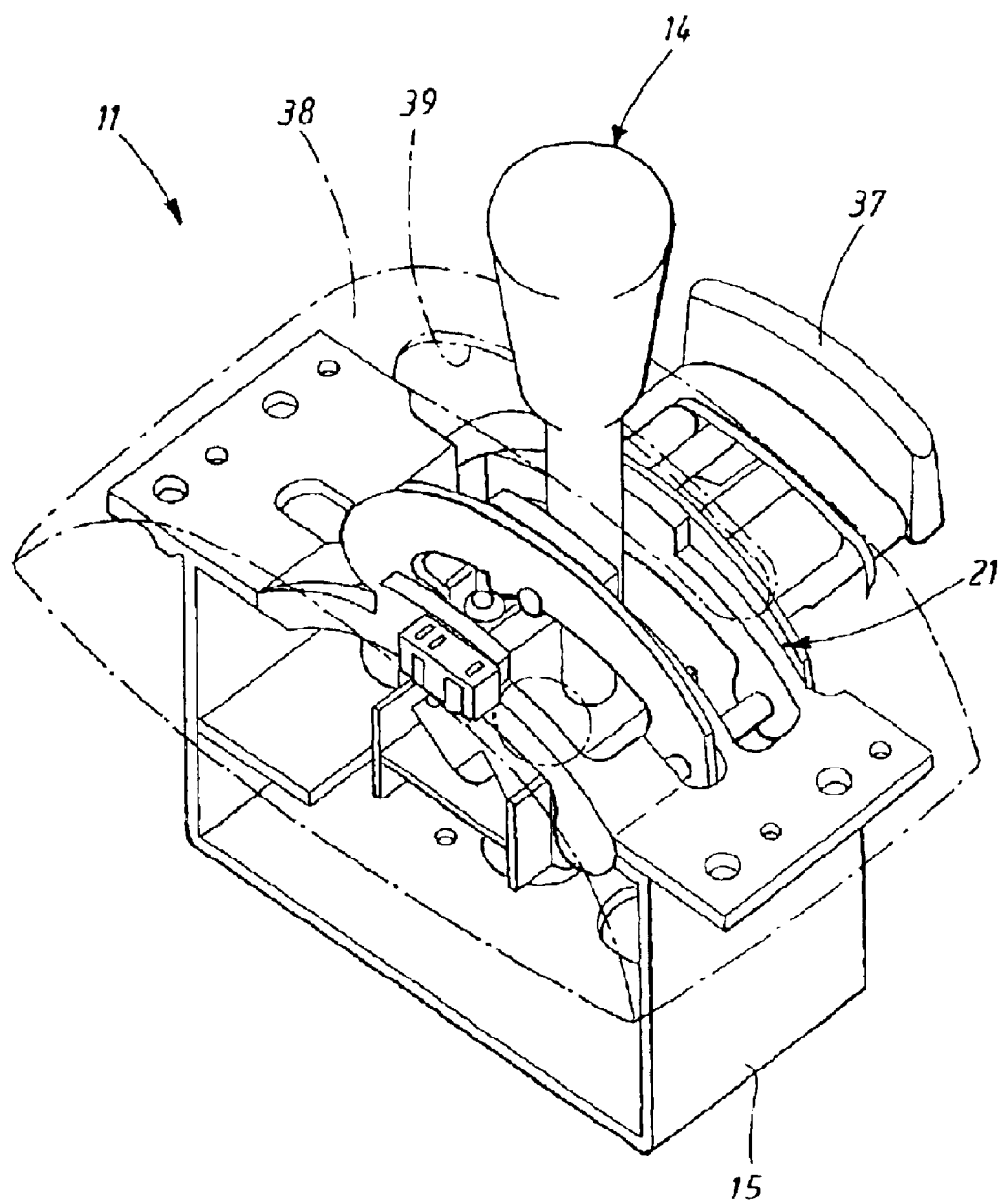
FIG. 9 shows a perspective view of the control with the cover fitted thereupon, but in phantom.

As shown in FIGS. 7, 8 and 9, the control 11 furthermore includes a manually activatable locking device designed, on activation, to lock the catch member 21 in its inoperative position, the operating lever 14 being moved into or retained in the holding position by the spring loading.

In FIG. 9, as in FIG. 4, the control 11 is shown with fitted cover 38, up through which the operating lever 14 projects in a rectangular slot 39.

Four symbols 40, 41, 42, 43 are shown in FIG. 8, each indicating various corresponding positions between the operating lever 14 and the dump body 2. The position at the symbol 40 relates to the "Dump body up" function whilst the symbols 41 and 42 respectively indicate the "Holding position" and "Floating position" described above. The symbol 43 finally indicates "Dump body down". In FIG. 8, the manually activatable locking device 37 is inserted into its operative locking position, in which the operating lever 14 is in the holding position.

As will be most clearly apparent from FIG. 4, the operating lever 14, together with the pin 31, can be depressed by an internal coil spring 44, which allows the operating lever 14 to be shifted from the holding position into other positions only by first depressing it.

The invention also includes a safety procedure for the operation of a dump body 2 of a truck 1 in which the dump body 2, through the operation of a control 11 in a driver's cab 4, and by means of at least one hydraulic or pneumatic lifting cylinder 5, is moved between a lowered transport position 6 and a raised tipping position 7, and furthermore assumes a floating position, in which the lifting cylinder 5 is not pressurized and a holding position in which the lifting cylinder 5 is pressurized and the position of the dump body 2 is locked. The procedure is characterized in that a detector 13 detects the driver's presence in, or absence from, the driver's cab 4 and delivers either a presence signal or an absence signal to the control 11 depending on whether or not the driver is in the driver's cab 4. The control 11, in the event of an absence signal from the detector 13, assumes the holding position.

In an advantageous embodiment of the procedure, the control 11 is provided with an operating lever that is spring-loaded in such a way that it endeavors to assume the holding position.

The invention is not confined to embodiments shown in the drawings and described above, but may be readily adapted without departing from the scope of the following claims; it being alternatively possible, for example, to replace the solenoid 23 by a pneumatic cylinder.

What is claimed is:

1. A safety device in a tipping dump body (2) of a truck (1), in which the dump body (2), through the operation of a control (11) in the driver's cab (4) of the vehicle (1) and by means of at least one preferably hydraulic lifting cylinder (5) is designed to be moved between a lowered transport position (6) and a raised tipping position (7), and to assume a floating position, in which the lifting cylinder (5) is not pressurized and a holding position in which the lifting cylinder (5) is pressurized and the position of the dump body (2) is locked, said safety device comprising:
    a detector (13) designed for detection of the driver's presence in or absence from the driver's cab (4), and that either a presence signal or an absence signal is delivered to the control (11) depending on whether or not the driver is in the driver's cab, and
    the control (11) being designed, in the event of an absence signal from the detector (13), to assume the holding position and wherein the control (11) is further provided with an operating lever (14) that is biased in such a way that the control (11) endeavors to assume the holding position.

2. The safety device as recited in claim 1, wherein the detector (13) is fitted on or adjacent to the driver's seat (12) in the vehicle (1).

3. The safety device as recited in claim 1, wherein the control further comprises:
    a mechanical catch member (21), which in an operative position is designed to allow the operating lever (14), and hence the dump body (2), to be placed in the floating position, and in an inoperative position is designed to permit return of the operating lever (14) to the holding position by means of spring loading.

4. The safety device as recited in claim 3, wherein the control (11) comprises a manually activatable locking device (37) designed, on activation, to lock the catch member (21) in its inoperative position, the operating lever (14) being moved into or retained in the holding position by the spring loading.

5. The safety device as recited in claim 3, wherein the catch member (21) is designed to interact with a solenoid (23), coupled to the detector, which solenoid (23) is designed to be activated in the event of a presence signal from the detector (13) and thereby to bring the catch member (21) into its operative position and also to be deactivated in the event of an absence signal from the detector and thereby to bring the catch member (21) into an inoperative position.

6. The safety device as recited in claim 5, wherein the detector (13) comprises an electrical switch, the presence signal corresponding to the closed position of the switch and the absence signal corresponding to the open position of the switch.

7. The safety device as recited in claim 5, wherein the catch member (21) further comprises:
    a clevis arm (24) having a first end section (25) adapted for engagement with the solenoid (23), a second end section (26), to which the clevis arm 24 is pivoted about a suspension axis (27) fixed in the body (15) of the control (11), and an intermediate section (28), the underside (29) of which has a profiled engagement surface (30) for interlocking engagement with a pin (31) projecting essentially at right angles from the operating lever (14).

8. The safety device as recited in claim 7, wherein the engagement surface (30) of the clevis arm (24) comprises a first slotted segment for interaction with the pin (31) of the operating lever (14) and a second slotted segment (32) for interaction with the pin (31) is formed on the underside (33) of a bridging section (34) of the body (15) of the control (11) extending parallel to the clevis arm (24).

9. The safety device as recited in claim 8, wherein the first slotted segment of the pivoted clevis arm 24 has a downwardly projecting catch heel (35) situated adjacent to the floating position of the operating lever (14), the catch heel (35) being designed to positively lock the pin (31) of the operating lever (14) when the clevis arm is in its operative position and the operating lever (14) is in the floating position.

10. The safety device as recited in claim 8, wherein the second slotted segment (32) has a recess for the pin of the operating lever (14), the recess (36) corresponding to the holding position.

11. A safety procedure for the operation of a dump body (2) of a truck (1), in which the dump body (2) through the operation of a control (11) in a driver's cab (4), and by means of at least one preferably hydraulic lifting cylinder (5), is moved between a lowered transport position (6) and a raised tipping position (7), and furthermore assumes a floating position, in which the lifting cylinder (5) is not pressurized and a holding position in which the lifting cylinder (5) is pressurized and the position of the dump body is locked, the safety procedure comprising:
    detecting, via a detector (13), a driver's presence in, or absence from, the driver's cab (14), and delivering either a presence signal or an absence signal to the control (11) depending on whether or not the driver is in the driver's cab (4), and
    causing the control (11) to assume, in the event of an absence signal from the detector (13), the holding position and providing the control (11) with an operating lever (14) that is spring-loaded in such way that it endeavors to assume the holding position.

12. A safety procedure for the operation of a dump body of a truck, the procedure comprising:
    adapting a truck with a dump body with a sensor that senses the presence of an operator in a cab of the truck;
    providing a control arrangement that manages movement and control of dumping functions of the dump body, including locking the dump body against movement;
    detecting the absence of an operator in the cab of the truck; and
    locking the dump body of the truck against motion in response to detection of the absence of an operator in the cab of the truck;
    positioning a sensing device in a drivers seat located in the cab of the truck that is adapted to produce different signals depending on whether an operator is sitting in the seat;

positioning an input control device adjacent to the drivers seat that is manipulatable by an operator to control operation of the dump body of the truck; and biasing the input control device to a position that locks the dump body of the truck against motion.

13. The safety procedure as recited in claim 12, further comprising:

providing a pivotable catch member at the input control device having a profiled engagement surface adapted to catch at a predetermined position for locking the dump body of the truck against motion.

14. The safety procedure as recited in claim 12, further comprising:

utilizing a switch in the sensor that is adapted to indicate the presence of an operator in the cab of the truck when in a closed configuration and to indicate the absence of an operator in the cab of the truck when in an open configuration.

15. The safety procedure as recited in claim 12, further comprising:

providing a pivotable catch member at the input control device having a profiled engagement surface adapted to catch at a predetermined position for locking the input control device in a floating position that permits motion of the dump body of the truck.

16. The safety procedure as recited in claim 15, further comprising:

configuring the pivotable catch member to include a pair of clevis arms and pivotably connecting one end of the pair of clevis arms to an actuating solenoid.

17. A safety procedure for the operation of a dump body of a truck, the procedure comprising:

adapting a truck having a dump body with a sensor that senses the presence of an operator in a cab of the truck;

providing a control arrangement that manages movement and control of dumping functions of the dump body, including locking the dump body against movement, said control arrangement being biased toward a configuration that locks the dump body of the truck against motion; and detecting the absence of an operator in the cab of the truck and locking the dump body of the truck against motion in response to detection of the absence of an operator in the cab of the truck.

18. The safety procedure as recited in claim 17, further comprising:

associating a sensing device with a driver's seat located in the cab of the truck that is adapted to produce different signals depending on whether an operator is sitting in the seat.

19. The safety procedure as recited in claim 18, further comprising:

positioning an input control device adjacent to the drivers seat that is manipulatable by an operator to control operation of the dump body of the truck; and spring-loading the input control device to a position that locks the dump body of the truck against motion.

* * * * *